(12) United States Patent
Baumann et al.

(10) Patent No.: US 6,671,119 B2
(45) Date of Patent: Dec. 30, 2003

(54) METHOD AND APPARATUS TO ENCODE POSITION ERROR SIGNAL CORRECTION INFORMATION

(75) Inventors: Todd David Baumann, Berthoud, CO (US); EweChye Tan, Longmont, CO (US)

(73) Assignee: Seagate Technology LLC, Scotts Valley, CA (US)

( * ) Notice: Subject to any disclaimer, the term of this patent is extended or adjusted under 35 U.S.C. 154(b) by 345 days.

(21) Appl. No.: 09/836,572

(22) Filed: Apr. 17, 2001

(65) Prior Publication Data

US 2001/0036033 A1 Nov. 1, 2001

Related U.S. Application Data

(60) Provisional application No. 60/198,002, filed on Apr. 18, 2000.

(51) Int. Cl.$^7$ .............................................. G11B 5/596
(52) U.S. Cl. ............................... 360/77.08; 360/78.14; 360/48
(58) Field of Search ........................ 360/48.75, 77.08, 360/78.14

(56) References Cited

U.S. PATENT DOCUMENTS

| | | | |
|---|---|---|---|
| 4,135,217 A | 1/1979 | Jacques et al. | |
| 4,136,365 A | 1/1979 | Chick et al. | |
| 4,412,165 A | 10/1983 | Case et al. | |
| 4,414,589 A | 11/1983 | Oliver et al. | |
| 4,536,809 A | 8/1985 | Sidman | |
| 4,594,622 A | 6/1986 | Wallis | |
| 4,679,103 A | 7/1987 | Workman | |
| 5,457,587 A | 10/1995 | Suzuki | |
| 5,793,559 A | 8/1998 | Shepherd et al. | |
| 5,825,578 A * | 10/1998 | Shrinkle et al. | 360/77.08 |
| 5,867,343 A * | 2/1999 | Le et al. | 360/77.08 |
| 5,978,169 A | 11/1999 | Woods | |
| 6,049,440 A | 4/2000 | Shu | |
| 6,069,764 A | 5/2000 | Morris et al. | |
| 6,493,173 B1 * | 12/2002 | Kim et al. | 360/77.04 |

FOREIGN PATENT DOCUMENTS

JP 11120720 4/1999

* cited by examiner

*Primary Examiner*—David Hudspeth
*Assistant Examiner*—K. Wong
(74) *Attorney, Agent, or Firm*—David K. Lucente; Derek J. Berger

(57) ABSTRACT

The present invention is a method of correcting radial position error signal (PES) values by utilizing predetermined error correction values located at predetermined locations in advance of their associated servo fields. Calculated correction values are written to zero-acceleration path (ZAP) fields on the disc during the manufacture process. ZAP fields are positioned before the servo fields whose PES they are designed to correct. The ZAP field is comprised of two or more correction data elements to correct subsequent PES values. As the read/write head flies along a track, it reads a ZAP field, and stores the PES correction data in local random access memory (RAM). Subsequently, the corresponding servo field is read and the stored PES correction data is used to correct the PES. Two types of ZAP fields are written on the disc—one type for read operations, another type for write operations. An arrangement of ZAP fields relative to servo and data track nulls allows for the read head to gather the ZAP field information in the write position, without having to move from the write position to the read position and back to the write position in the middle of a write operation.

16 Claims, 10 Drawing Sheets

METHOD AND APPARATUS TO ENCODE POSITION ERROR SIGNAL CORRECTION INFORMATION

RELATED APPLICATIONS

This application claims priority of U.S. provisional application Ser. No. 60/198,002 filed Apr. 18, 2000.

FIELD OF THE INVENTION

This application relates generally to computer disc drives and more particularly to disc drive read/write head positioning.

BACKGROUND OF THE INVENTION

Disc drives enable users of modern computer systems to store and retrieve vast amounts of data in a fast and efficient manner. A typical disc drive houses a number of circular, magnetic discs (such as one to ten) which are axially aligned and rotated by a spindle motor at a constant, high speed (such as 10,000 revolutions per minute). As the discs are rotated, an actuator assembly moves an array of read/write heads out over the surfaces of the discs to store and retrieve the data from tracks defined on the surfaces of the discs.

A closed loop digital servo system is typically used to control the position of the heads relative to the tracks. The servo system generates a position error signal (PES) indicative of the position of the heads from servo information that is written to the discs during the manufacturing of the disc drive. In response to the detected position, the servo system outputs current to an actuator motor (such as a voice coil motor, or VCM) utilized to pivot the actuator assembly, and hence the heads, across the disc surfaces.

It is a continuing trend in the disc drive industry to provide successive generations of disc drive products with ever increasing data storage capacities and data transfer rates. Because the amount of disc surface area available for the recording of data remains substantially constant (or even decreases as disc drive form factors become smaller), substantial advancements in areal recording densities, both in terms of the number of bits that can be recorded on each track as well as the number of tracks on each disc, are continually being made in order to facilitate such increases in data capacity.

Recent changes in disc drive recording head technology have made it advantageous to use separate elements for reading and writing. Using two elements allows one element to be designed to perform as an optimum reader and the other as an optimum writer, avoiding the tradeoffs associated with implementing both functions in a single element. A performance synergy can result if the two are designed to complement each other. For example, a writer may be designed to write a relatively wide path and the reader designed to have a narrower read width. Together, they yield a greater storage density for a given level of tracking precision by permitting the reader to practically weave across a data track without sacrificing signal strength. Unfortunately, using separate read and write elements introduces a positioning problem because the two elements are separated by an appreciable gap. The gap and the skew angle make it impossible to position both elements in-line over all tracks. Consequently, in disc drives using magnetoresistive read elements and inductive write elements, there are separate read and write positions.

The servo information used to define the tracks is typically written to the discs following drive assembly in the manufacturing process using a highly precise servo track writer. While the tracks are intended to be concentric, uncontrolled factors such as vibrational tolerances in the servo track writer, spindle resonances, misalignments of the discs and the like tend to introduce if errors in the location of the servo information recorded on the discs. Each track is thus typically not perfectly concentric, but rather exhibits certain random, repeatable variations that are sometimes referred to as repeatable runout, or RRO, with the RRO appearing as an error component of the PES.

While RRO has previously had a minimal impact upon the operation of the servo system, RRO has an increasingly adverse affect as higher track densities are achieved. Particularly, RRO can ultimately lead to an upper limit on achievable track densities, as RRO cuts into the available track misalignment budget and reduces the range over which the servo system can provide stable servo control.

Accordingly there is a need for a method of correcting radial position error of disc drive heads.

SUMMARY OF THE INVENTION

Against this backdrop the present invention has been developed. The present invention is a method of correcting radial position error by utilizing predetermined error correction values located at predetermined locations in advance of their associated servo fields. During manufacture of a disc drive, radial position compensation values are calculated. The radial position compensation values are written to zero-acceleration path (ZAP) fields on the disc. Each ZAP field is positioned before the servo fields whose position error signal(PES) they are designed to correct. As the read/write head flies along a track, it reads a ZAP field, and stores the PES correction data. Subsequently, the read/write head reads the corresponding servo field and uses the stored PES correction data to correct the PES.

The ZAP field is comprised of two or more correction data elements, a starting sample number byte, and an error correction code. The starting sample number refers to the starting servo field and to a location in a data table where to store the correction data. Each correction data corresponds to each of the next subsequent servo fields following the starting servo field.

Two types of ZAP fields are written on the disc: read ZAP fields and write ZAP fields. The disc drive uses the read ZAP fields to correct the PES during subsequent read operations and write ZAP fields to correct the PES during subsequent write operations. Read ZAP fields are written in line with the data track nulls, while write ZAP fields are written in line with the servo track nulls. This novel arrangement allows for the read head to gather the ZAP field information in the write position, without having to move from the write position to the read position and back to the write position in the middle of a write operation.

The invention can provide multiple chances for the read/write head to read the ZAP fields prior to reading an associated servo field. For each servo field one or more ZAP fields may apply. Redundancy is built into the error correction method when more than one ZAP field refers to each servo field. Forward redundancy ensures that the ZAP field data is read correctly.

During normal disc drive operation, a ZAP table is used to store ZAP field data. The ZAP table is stored in memory. Upon any repositioning of the recording head, the table is initialized to zero. When a valid ZAP field is read, its correction data is saved in the ZAP table at the memory locations corresponding to the servo fields with which the ZAP field is associated. When the associated servo fields are subsequently read, the stored associated ZAP field data is retrieved and used to correct error in the PES.

If, upon a read of a ZAP field, it is determined that there are errors that the error correction code(ECC) process is unable to correct, the ZAP correction data is not saved in the table. Since the table was previously initialized to zero, correction of servo fields associated with the invalid ZAP field will effectively be a correction factor of zero, or no correction at all. In the preferred redundant system, the latest valid ZAP field correction data is stored. Thus, whenever the ZAP field is valid, the data is stored, and this will mean writing over previously valid data. This is not a problem because the redundant correction data for adjacent ZAP fields is the same.

These and various other features as well as advantages which characterize the present invention will be apparent from a reading of the following detailed description and a review of the associated drawings.

BRIEF DESCRIPTION OF THE DRAWINGS

FIG. 6-1 is a flow control diagram illustrating an exemplary process of building and storing ZAP fields in a preferred embodiment of the invention.

FIG. 6-2 is a flow control diagram illustrating an exemplary process of calculating and storing radial position compensation values in an embodiment of the invention.

DETAILED DESCRIPTION

Figure 1:
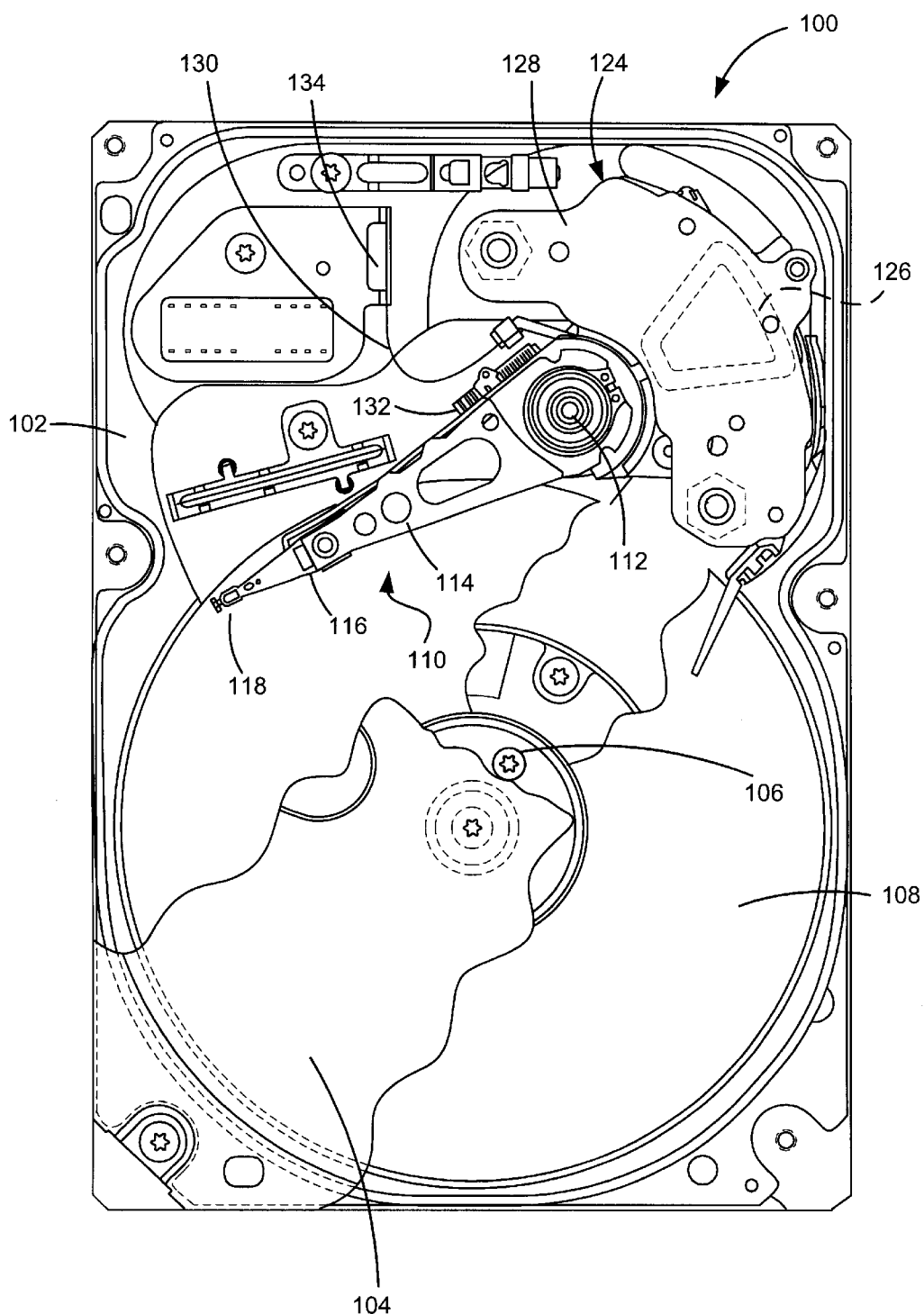
FIG. 1 is a plan view of a disc drive incorporating a preferred embodiment of the present invention showing the primary internal components.

The invention is described in detail below with reference to the drawing figures. When referring to the figures, like structures and elements shown throughout are indicated with like reference numerals.

A disc drive 100 constructed in accordance with a preferred embodiment of the present invention is shown in FIG. 1. The disc drive 100 includes a base 102 to which various components of the disc drive 100 are mounted. A top cover 104, shown partially cut away, cooperates with the base 102 to form an internal, sealed environment for the disc drive in a conventional manner. The components include a spindle motor 106 which rotates one or more discs 108 at a constant high speed. Information is written to and read from tracks on the discs 108 through the use of an actuator assembly 110, which rotates during a seek operation about a bearing shaft assembly 112 positioned adjacent the discs 108. The actuator assembly 110 includes a plurality of actuator arms 114 which extend towards the discs 108, with one or more flexures 116 extending from each of the actuator arms 114. Mounted at the distal end of each of the flexures 116 is a transducer head 118 which includes an air bearing slider enabling the head 118 to fly in close proximity above the corresponding surface of the associated disc 108.

During a seek operation, the track position of the heads 118 is controlled through the use of a voice coil motor (VCM) 124, which typically includes a coil 126 attached to the actuator assembly 110, as well as one or more permanent magnets 128 which establish a magnetic field in which the coil 126 is immersed. The controlled application of current to the coil 126 causes magnetic interaction between the permanent magnets 128 and the coil 126 so that the coil 126 moves in accordance with the well-known Lorentz relationship. As the coil 126 moves, the actuator assembly 110 pivots about the bearing shaft assembly 112, and the heads 118 are caused to move across the surfaces of the discs 108.

The spindle motor 106 is typically de-energized when the disc drive 100 is not in use for extended periods of time. The heads 118 are moved over park zones 120 near the inner diameter of the discs 108 when the drive motor is de-energized. The heads 118 are secured over the park zones 120 through the use of an actuator latch arrangement, which prevents inadvertent rotation of the actuator assembly 110 when the heads are parked.

A flex assembly 130 provides the requisite electrical connection paths for the actuator assembly 110 while allowing pivotal movement of the actuator assembly 110 during operation. The flex assembly includes a printed circuit board 132 to which head wires (not shown) are connected; the head wires being routed along the actuator arms 114 and the flexures 116 to the heads 118. The printed circuit board 132 typically includes circuitry for controlling the write currents applied to the heads 118 during a write operation and a preamplifier for amplifying read signals generated by the heads 118 during a read operation. The flex assembly terminates at a flex bracket 134 for communication through the base deck 102 to a disc drive printed circuit board (not shown) mounted to the bottom side of the disc drive 100.

Figure 2:
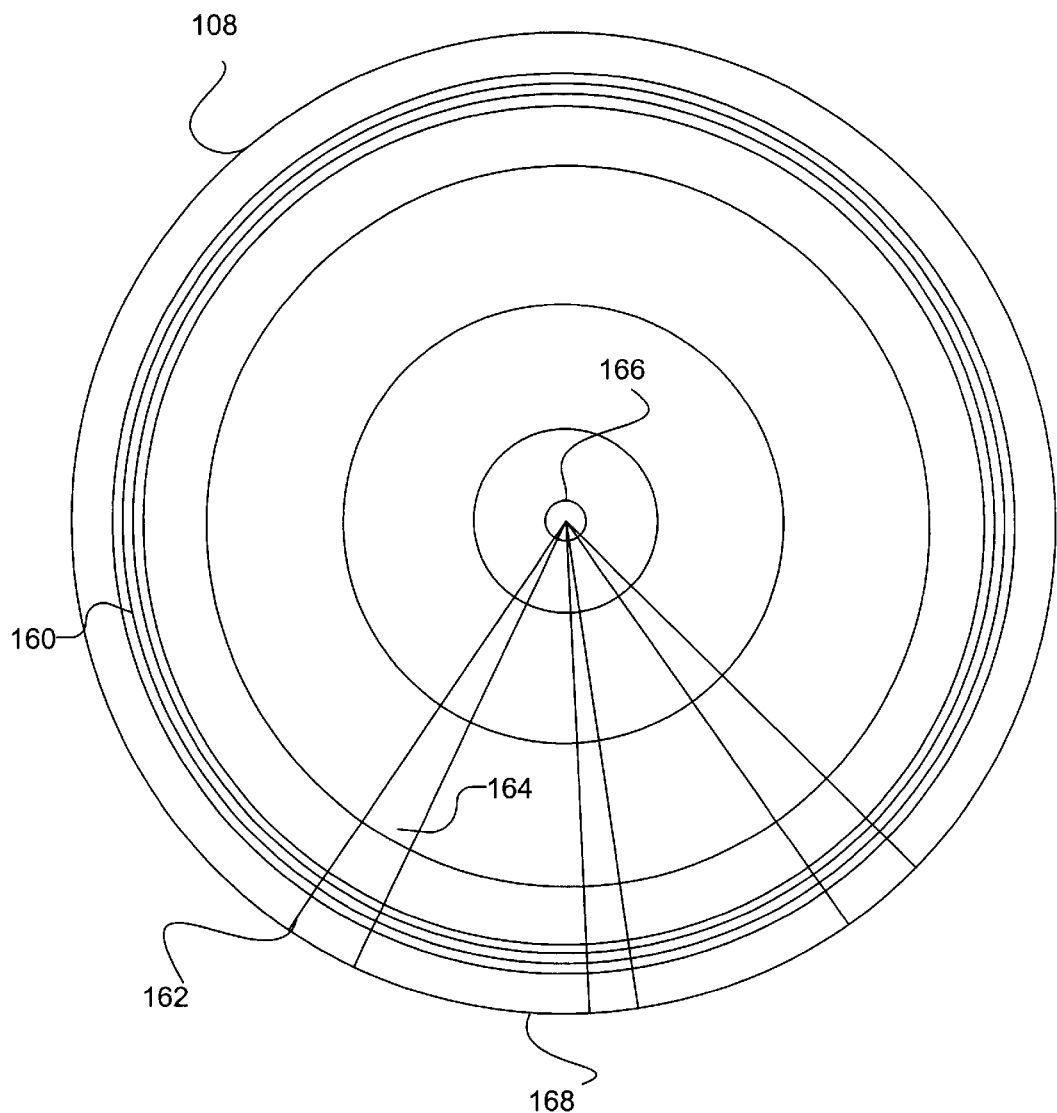
FIG. 2 depicts a plurality of servo wedges on a disc of the disc drive, illustrating the manner in which servo information is stored on the disc.

Referring now to FIG. 2, shown therein is a plan view of the disc 108, generally showing the main components on the surface of the disc 108. The discs 108 are circumferentially divided into a plurality of concentric circular tracks 160. The number of tracks 160 per disc 108 will vary with each particular manufactured disc 108. A one-time revolution (INDEX) around each track 160 is typically indicated by an index mark 162 that extends the radius of the disc 108.

The disc 108 is radially divided into a plurality of servo segments 164. Typically, the servo segments 164 begin near the center 166 of the disc 108 and terminate near the outer edge 168 of the disc 108. As with the number of tracks 160 per disc 108, the number of servo segments 164 per disc 108 varies with each particular manufactured disc 108. Each track 160 is composed of spaced servo segments 164 with data sectors between the servo segments 164.

Figure 3:
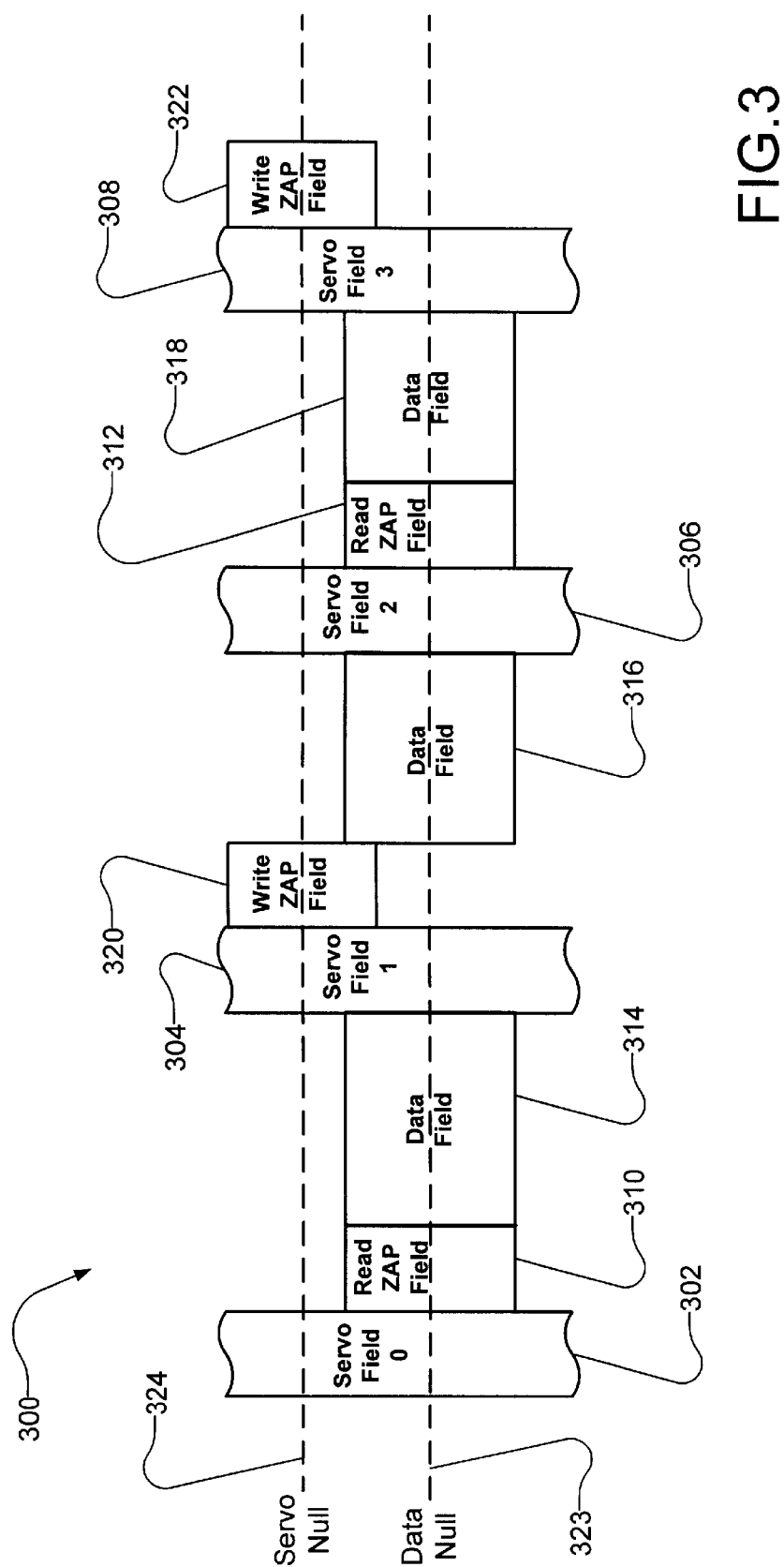
FIG. 3 illustrates one possible positioning of servo, zero acceleration path (ZAP), and data fields in accordance with a preferred embodiment of the present invention.

FIG. 3 illustrates an arrangement of servo fields, data fields, and ZAP fields, on a track, for example Track 0 (300), relative to each other in a preferred embodiment of the invention. As further described below, the track arrangement contemplated by the present invention provides a servo field PES correction technique. Such a technique allows the drive to determine PES error and thereby adjust the drive head 118 alignment in both a read operation and a write operation, without repositioning the drive head 118.

Servo Field 0 (302), Servo Field 1 (304), Servo Field 2 (306), and Servo Field 3 (308) each contain servo positioning information, including PES. The read ZAP fields 310 and 312 contain PES correction data, referred to as radial position compensation values, and are accessed when the disc drive head 118 is in the read position. The data fields 314, 316, and 318 contain the data desired by the user. Write ZAP Fields 320 and 322 contain PES correction data, called radial position compensation values, and are accessed when the disc drive head 118 is in the write position. As described in detail below, the ZAP fields are utilized to correct head alignment errors during operation of the disc drive.

The data null 323 is the ideal track that the head 118 should follow and is defined by the line about which the data is centered. Data fields 314, 316, 318 and the read ZAP fields 310 and 312 are ideally centered on the data null 323. In the preferred embodiment, the write ZAP fields 320 and 322 are centered on the servo null 324. The servo null 324 is the line about which servo bursts of opposite polarity are centered, so that when the head overlaps equal magnitudes of servo bursts of opposite polarity, the sum is zero. Servo nulls 324 are described in more detail by Oliver, et. al. in U.S. Pat. No. 4,414,589. When the head is in the write position, the read transducer is aligned with the write ZAP fields 320 and 322. With this arrangement, the read head 118 gathers PES correction information from the write ZAP fields 320 and 322 in the write position without having to reposition to the read position.

Figure 4:
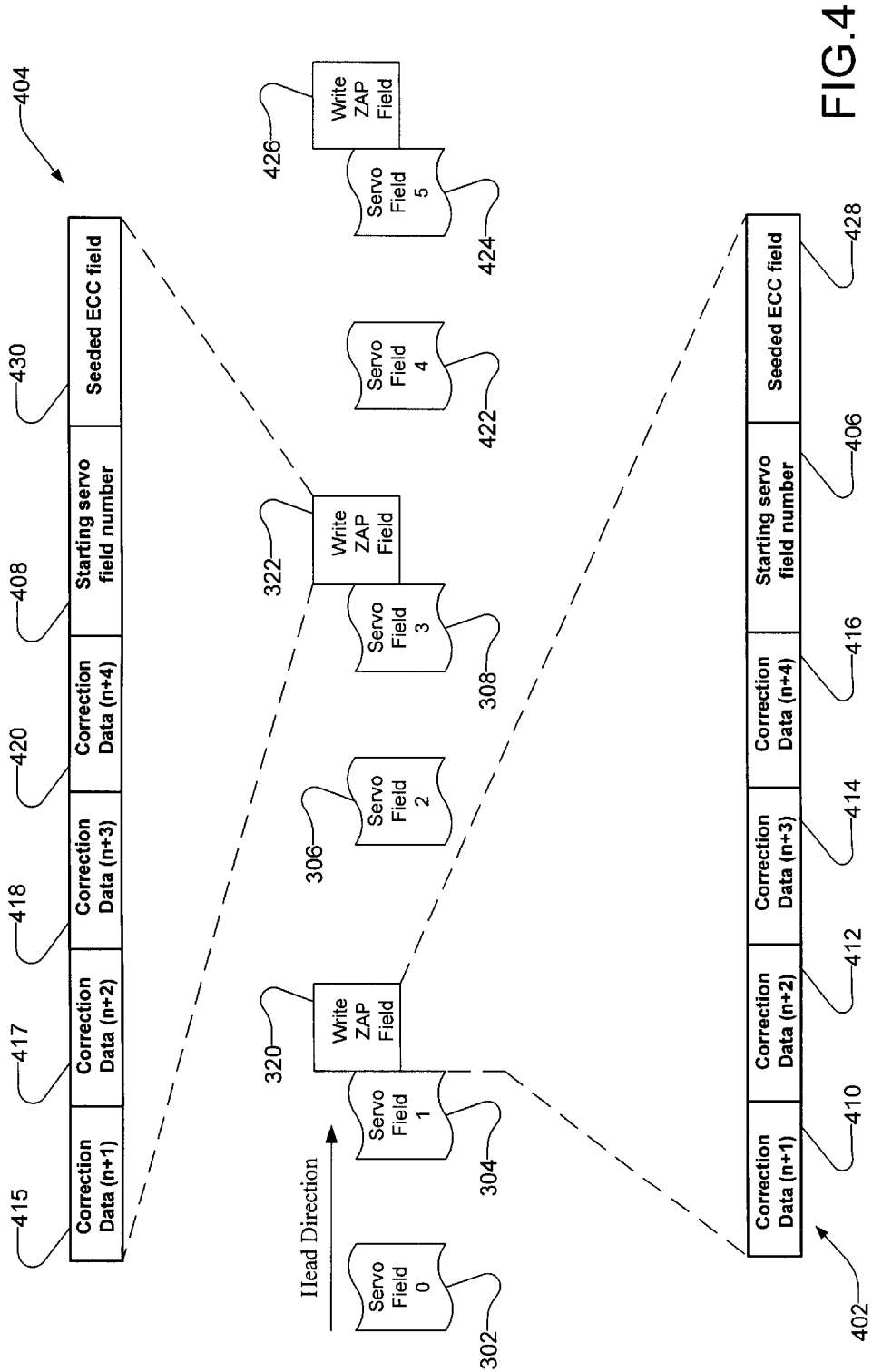
FIG. 4 illustrates the sequence of fields in the read position and the data format in accordance with a preferred embodiment of the present invention.

FIG. 4 illustrates the sequence of fields with the head 118 in the write position and the data format in accordance with a preferred embodiment of the present invention. The write ZAP field 320 has a data format 402. The write ZAP field 322 has a data format 404. Starting Servo Field Numbers 406 and 408 are the numbers of the servo fields adjacent to the write ZAP fields 320 and 322 respectively. For example, the starting servo field number 406 is 2 and the starting servo field number 408 is 4. The starting servo field number 406 serves as a reference for the correction data (n+1) 410, (n+2) 412, (n+3) 414, and (n+4) 416. Likewise, the starting servo field number 408 serves as a reference for the correction data (n+1) 415, (n+2) 417, (n+3) 418, (n+4) 420.

The correction data (n+1) 410, (n+2) 412, (n+3) 414, and (n+4) 416 are radial position compensation values for the four servo fields subsequent to the servo field 1 (304). Thus, the correction data (n+1) 410 is correction data for the servo field 2 (306), and the correction data (n+2) 412 is correction data for the servo field 3 (308). Likewise, the correction data (n+3) 414 is correction data for the servo field 4 (422), and the correction data (n+4) 416 is correction data for servo field 5 (424).

Likewise, the correction data (n+1) 415, (n+2) 417, (n+3) 418, and (n+4) 420 are radial position compensation values for the four servo fields subsequent to the servo field 3 (308). The correction data (n+1) 415 contains correction data for the servo field 4 (422), and the correction data (n+2) 417 contains PES correction data for servo field 5 (424). The correction data (n+3) 418 and (n+4) 420 contain PES correction data for the servo fields that are not shown in FIG. 4, but are immediately subsequent to the write ZAP field 426.

One can readily observe that the write ZAP field 320 and the write ZAP field 322 contain two correction data elements that correspond to identical servo fields. The correction data (n+3) 414 corresponds to the servo field 4 (422) and the correction data (n+1) 415 corresponds to the servo field 4 (422). The correction data (n+4) 416 corresponds to the servo field 5 (424) and the correction data (n+2) 417 corresponds to the servo field 5 (424). Having the same data in subsequent ZAP fields provides redundancy such that if the write ZAP field 320 has uncorrectable errors when it is read, the write ZAP field 322 serves as a backup for two radial compensation values.

In a preferred embodiment, the correction data is a byte of data, allowing for a range of 256 values. Preferably one bit in the data byte is used as a sign bit, so the values range from −128 to 127. In a preferred embodiment the value −128 is reserved to indicate to the control system described in FIG. 1 that the corresponding servo field data is invalid and should be ignored. For example, if the correction data 410 is −128, this indicates that the servo field 2 (306) is invalid. Other values throughout the range of values could be assigned different meanings or represent a magnitude adjustment for PES data.

Error correction codes(ECC) in ZAP fields are used to detect and attempt to correct errors in ZAP fields. Referring to FIG. 4, the seeded ECC fields 428 and 430 allow the disc drive PES error correction system to identify and correct errors in the write ZAP fields 320 and 322 respectively. Seeded ECC fields 428 and 430 are generated using any cyclic redundancy code scheme, including, but not limited to the well-known Reed-Solomon Code. Those skilled in the art will recognize that ECC validation allows for identification of any number of errors, but correction of up to a maximum number of errors. If the write ZAP field 320 contains errors beyond the capability of the seeded ECC field 428 to correct, the redundant data of the write ZAP field 322 is used instead.

FIG. 4 illustrates how write ZAP fields are used when the head 118 is in the write position. Read ZAP fields are not used when the head 118 is in the write position, but they are used to correct PES when the head 118 is in the read position. An example analogous to the FIG. 4 example, wherein only write ZAP fields are illustrated, exists for the situation when the head 118 is in the read position, when read ZAP fields are used.

In yet another embodiment, the system need not provide redundancy. The write ZAP fields 320 and 322 are aligned with the servo null 324, as in the preferred embodiment, but the PES correction data is not duplicated from one ZAP field to the next. For example, the data format 402 may contain only the correction data (n+1) 410 and the correction data (n+2) 412. The correction data (n+1) 415 and (n+2) 417 would not be present in the data format 404. This embodiment may be desirable in situations where more memory is required for data other than ZAP field data.

Figure 5:
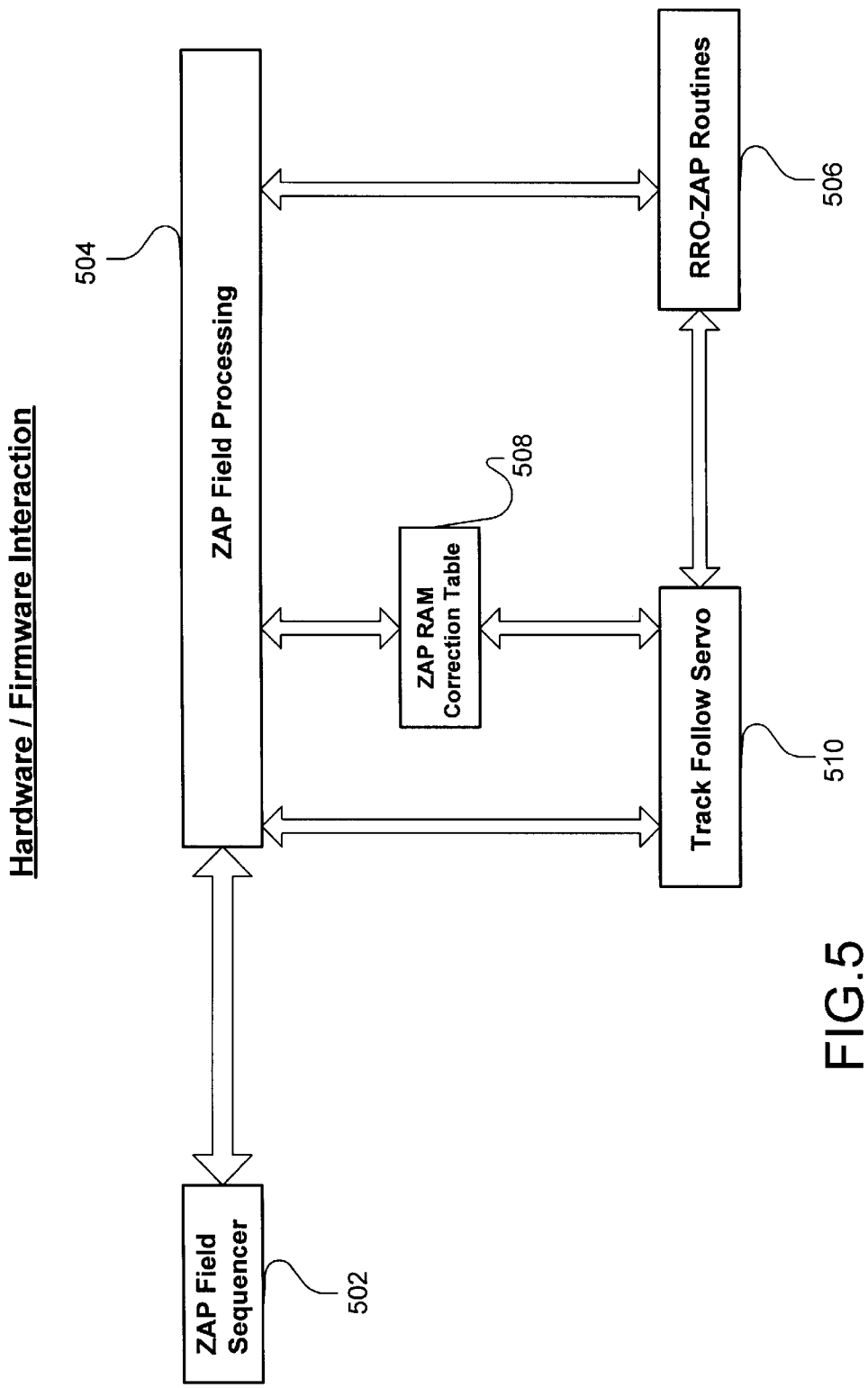
FIG. 5 illustrates the component interactions in accordance with a preferred embodiment of the present invention.

FIG. 5 is an illustration of the module interactions in accordance with a preferred embodiment of the present invention. The ZAP field sequencer module 502 reads and sequences through ZAP fields. The ZAP field processing module 504 accepts valid ZAP fields from the ZAP field sequencer module 502 and stores the data in the proper memory location in the ZAP RAM correction table 508. Later, when a servo field is read, the ZAP field processing module 504 retrieves the corresponding ZAP field PES correction data from the ZAP RAM correction table 508. The RRO-ZAP routines module 506 adjusts the PES data retrieved from the servo field using the retrieved PES correction data. The corrected PES data is transferred to the track follow servo 510, which adjusts the positioning of the head 118.

For example, the ZAP field sequencer 502 reads and validates the write ZAP field 320. If the write ZAP field 320 is valid, its data is passed on to the ZAP field processing module 504. The ZAP field processing module 504 stores the correction data (n+1) 410, (n+2) 412, (n+3) 414, and (n+4) 416 in a memory locations corresponding to the servo fields 2 (306), 3 (308), 4 (422), and 5 (424). When the servo field 2 (306) is read, the ZAP field processing module 504 reads the data in the memory location of the ZAP RAM correction table 508 corresponding to the servo field 2 (306). The ZAP field processing module 504 transfers the ZAP field data to the RRO-ZAP routines module 506. The RRO-ZAP routines module uses the ZAP field data to make the proper adjustments to PES of the servo field 2 (306). The RRO-ZAP routines module 506 transfers the corrected PES to the track follow servo 510.

The ZAP RAM correction table 508 is initialized with zero values whenever the heads 118 are repositioned. This ensures that invalid correction data will not be in the ZAP RAM correction table when a servo field is read. If no valid ZAP fields are read for a servo field, no ZAP field correction data will be written to the ZAP RAM correction table 508. Thus, for that particular servo field, the ZAP field processing module 504 will transfer a zero value to the RRO-ZAP routines module 506. In this case, the adjustment made to PES by RRO-ZAP Routines 506 is an adjustment of zero. Thus, PES of a particular servo burst is not changed when no valid ZAP fields are read for that servo burst.

Figures 1, 6:
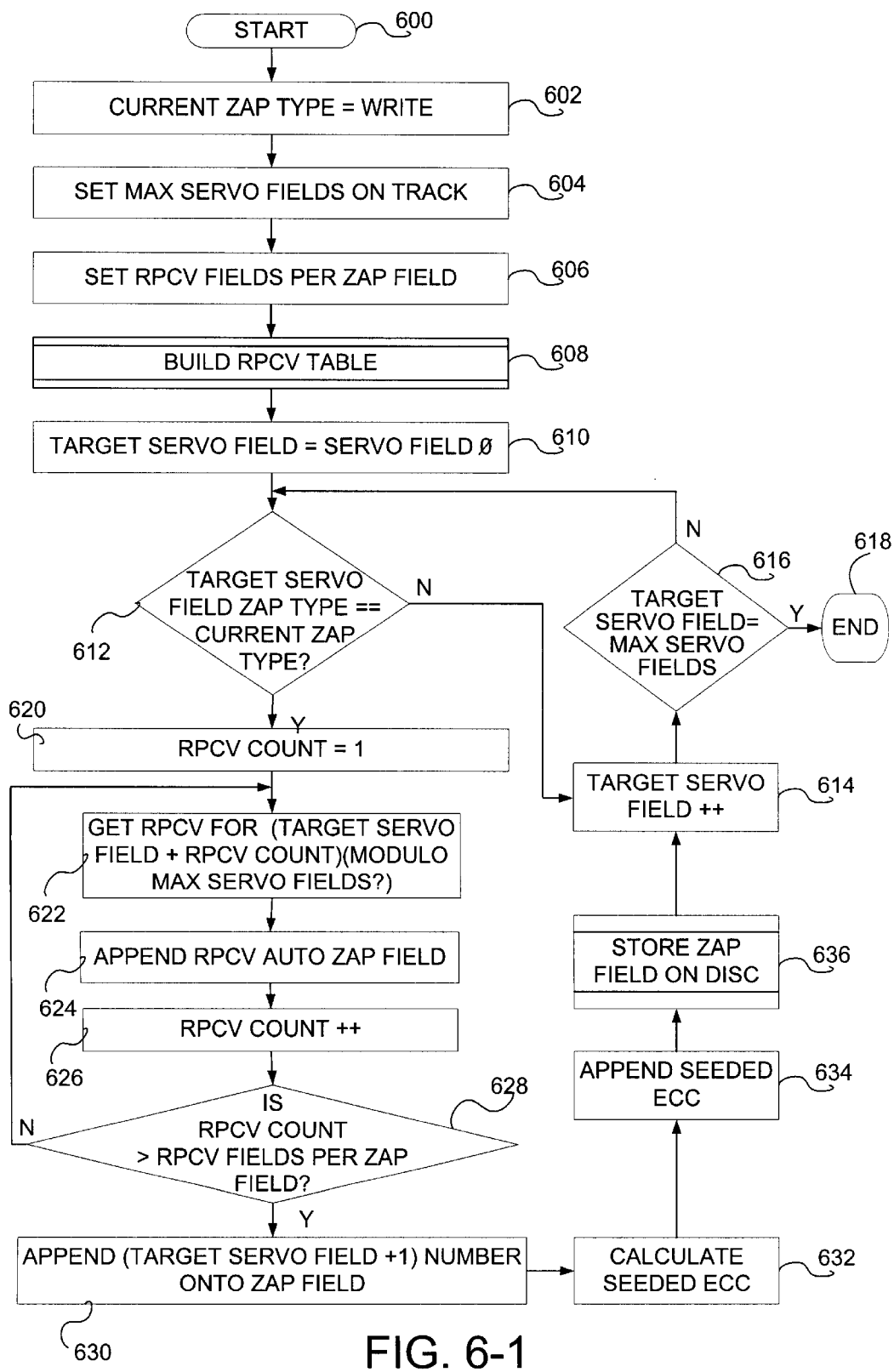
Figures 2, 6:
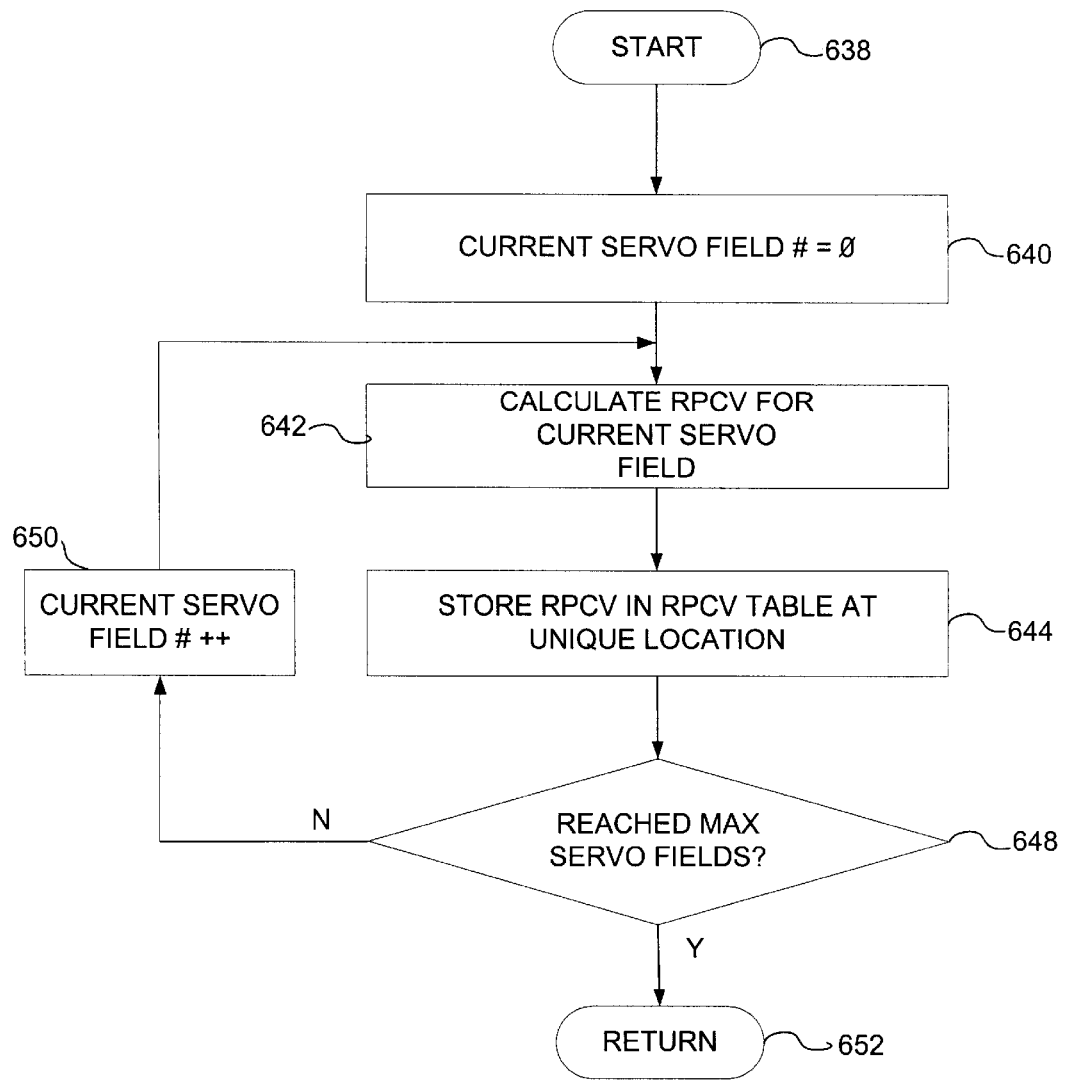

Turning now to FIG. 6-1, there is shown a diagram illustrating an exemplary process by which radial position compensation values (RPCV) are determined and stored in a preferred embodiment of the invention. As previously mentioned, this process occurs during the manufacture of the disc drive. Processing begins at the start operation 600 wherein basic startup initializing occurs. Control then transfers to initializing operation 602 wherein the current ZAP type is initialized to the write type. Control then transfers to initializing operation 604 wherein the maximum number of servo fields is set equal to the number of servo fields on the track. Control then transfers to initializing operation 606 wherein the number of radial position compensation values (RPCV) is set. As discussed earlier in reference FIG. 4, the preferred number of RPCVs per ZAP field is four. After initializing operation 606, control transfers to building operation 608. Building operation 608 constructs a table of RPCVs for every servo field on the track and is preferably performed with a function call. The details of building the RPCV table are shown in FIG. 6-2, and will be discussed later. After the RPCV table is built, control transfers to initializing operation 610 wherein the target servo field is initialized to servo field Ø (302), shown in FIG. 4.

After the target servo field is initialized, control transfers to the querying operation 612 wherein it is determined whether the ZAP type of the target servo field is equal to the current ZAP type. Referring to FIG. 3, it can be seen that the ZAP type of servo field Ø (302) is a read ZAP type; i.e., the read ZAP field 310 adjacent to servo field Ø (302) is a read type ZAP field. Thus, continuing with the example of FIG. 6-1, the answer to the query in operation 612 would be "no" for servo field Ø in FIG. 3 because the current ZAP type is WRITE.

Determining the type of ZAP field for a particular servo field can be performed in any manner. For example, it may simply be a matter of associating odd-numbered servo fields with write ZAP fields and even-number servo fields with read ZAP fields as shown in the example of FIG. 3. Alternatively, read ZAP fields may be associated with odd-numbered servo fields and write ZAP fields associated with even-numbered servo fields. The determination of query operation 612 may also make use of a table that associates servo fields with ZAP field types in any manner of association.

Continuing with the examples of FIG. 6-1 and FIG. 3, control then transfers from querying operation 612 to the incrementing operation 614 wherein the target servo field is advanced to the next servo field. After the target servo field is incremented, control transfers to querying operation 616, wherein the question is asked whether the target servo field number is equal to the maximum number of servo fields on the track. If it is equal to the maximum number of servo fields, then all the ZAP fields have been created and stored, and control transfers to end operation 618, where processing ends. If, on the other hand, the target servo field is not equal to the maximum number of servo fields on the track, control transfers back to query operation 612 wherein it is determined whether the new target servo field's ZAP field is the current ZAP field type.

If in query operation 612 it is determined that the ZAP field type for the target servo field is equal to the current type, then control transfers to initializing operation 620. An example of this is best seen in FIG. 3 with regard to servo field 1 (304) and the adjacent write ZAP field 320. For servo field 1, it is determined in query operation 612 that the ZAP field type is the write type. Since, in the example of FIG. 6-1, the current ZAP type was set to WRITE in initializing operation 602, the answer to the query in operation 612 is "yes."

When control transfers to initializing operation 620, a counter, radial position compensation value (RPCV) count is set equal to one. Control then transfers to the retrieving operation 622 wherein the RPCV is retrieved from the RPCV table that was built in the building operation 608. The RPCV that is retrieved is an RPCV for a servo field located after the target servo field. This is best seen in reference to FIG. 4, wherein the head direction goes from servo field 1 to servo field 2. In this case, servo field 2 is rotationally subsequent to servo field 1. Thus, in retrieving operation 622, the RPCV for servo field 2 is retrieved when the target servo field is servo field 1 and RPCV count is one.

The modulo operation is necessary for target servo fields just prior to servo field Ø; i.e., when the ZAP field building and storing process is nearing the end of a track. Modulo is the remainder obtained when dividing one number by another number, and is well-known in the art. When the target servo field is fewer than the number of RPCV fields per ZAP field prior to starting servo field Ø, then the RPCVs for lower numbered servo fields are used to build the ZAP field, because of the cyclic nature of the disc tracks. For example, if the maximum servo fields on the track is 120, and there are four RPCVs per ZAP field, and the target servo field is servo field 119 (the last servo field on the track), then the modulo operation ensures that the ZAP field for servo field 119 is loaded with RPCVs for servo field Ø, servo field 1, servo field 2, and servo field 3.

After the desired RPCV is retrieved, control transfers to appending operation 624. The RPCV is appended to the ZAP field in operation 624, and control then transfers to the incrementing operation 626. In the incrementing operation 626, the RPCV count is incremented. Control then transfers to the query operation 628 wherein it is asked whether the RPCV count is greater than the number of RPCVs per ZAP field. If it is not, then control transfers back to retrieving operation 622 wherein the next RPCV value is retrieved from the RPCV table. Thus the looping process in the retrieving, appending, incrementing and querying operations 622, 624, 626, and 628 build the ZAP field with the RPCVs for that ZAP field.

If, on the other hand, the answer to the query in the query operation 628 is "yes," this means that the ZAP field has been loaded with the required RPCVs. Control then transfers to appending operation 630, wherein the starting servo field number is appended to the ZAP field. For example, in FIG. 4, referring to the data format 402, starting servo field number 406 would be two. The starting servo field number is obtained by adding one to the target servo field number. After the starting servo field number is appended, control transfers to calculating operation 632 wherein the contents of the ZAP field are used to generate a seeded error correction code (ECC). Control then transfers to the appending operation 634, wherein the seeded ECC is appended to the ZAP field. After the seeded ECC is appended, the ZAP field contains all the required elements. For example, the data format 402 in FIG. 4 illustrates what an exemplary ZAP field looks like after appending the seeded ECC.

Figure 7:
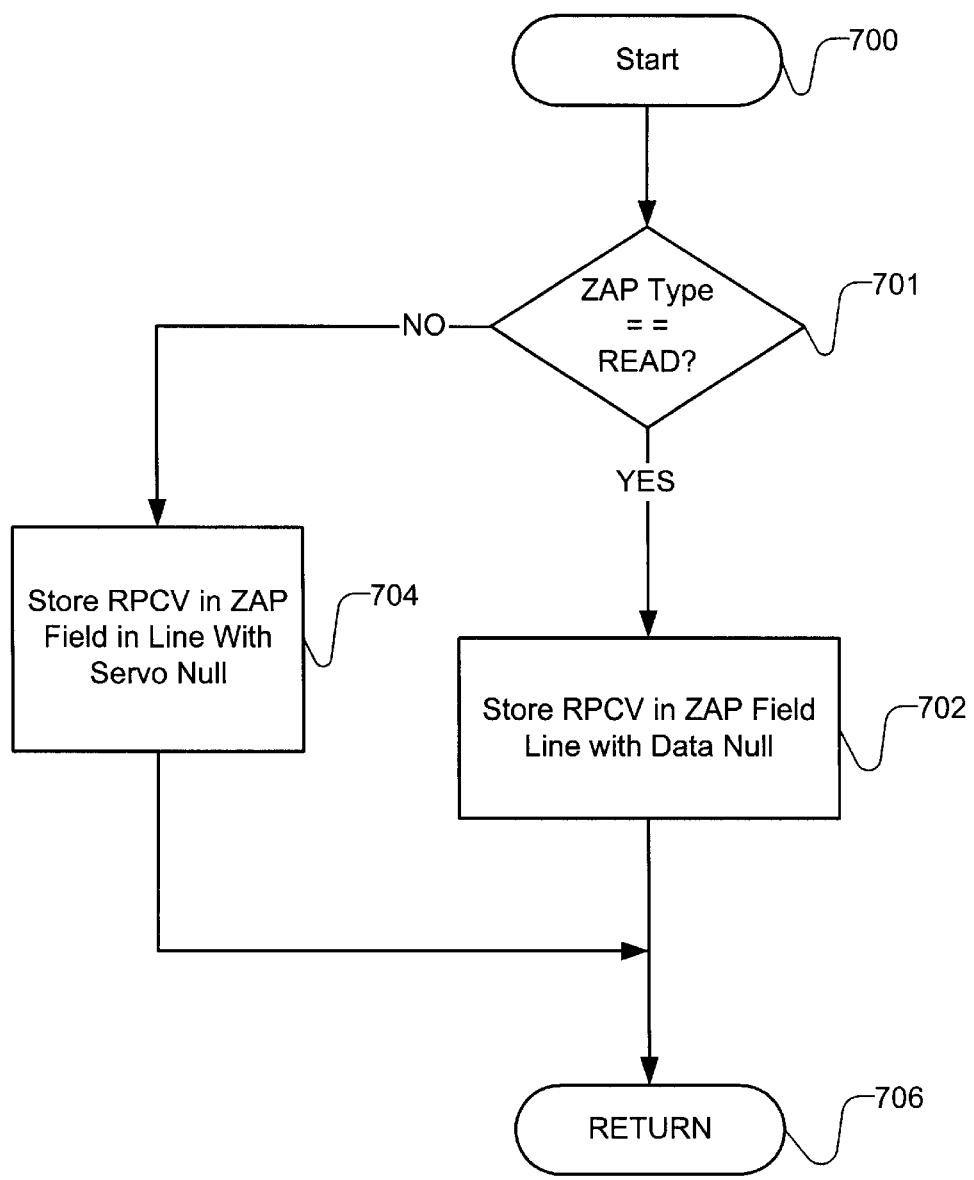
FIG. 7 is a flow control diagram illustrating an exemplary process of storing ZAP fields in a preferred embodiment of the invention.

Control then transfers to the storing operation 636 wherein the ZAP field is stored on the disc. The storing operation 636 is preferably carried out by a storing function, as shown in FIG. 7. As will be discussed in more detail, the storing operation is aware of the type of ZAP field to be stored (i.e., read or write). After the ZAP field is stored on the disc, control transfers back to incrementing operation 614, wherein the target servo field number is incremented by one. After the incrementing operation 614, the prior described operations are repeated in a looping fashion until all the ZAP fields are built and stored on the disc. The process illustrated in FIG. 6-1 is sufficient for building and storing all the ZAP fields for a single track. To store all the ZAP fields for all tracks of a disc, the process simply needs to be repeated for all the tracks on the disc.

Referring now to FIG. 6-2, there is shown a flow chart illustrating the process by which RPCVs are calculated and stored in a table. When the process shown in FIG. 6-2 is invoked, control is transferred to start operation 638, wherein basic initialization occurs. Control then transfers to the initializing operation 640, wherein the current servo field is set to the first servo field on the track. After the current servo field is initialized, control transfers to the calculating operation 642. In the calculating operation 642 a RPCV is calculated for the current servo field using any compensation value calculation method known in the art, including, but not limited to, any fast-fourier transform (FFT) method. Control then transfers to storing operation 644 wherein the previously calculated RPCV is stored in a table in memory. The table associates a RPCV with each servo field. Later, the table can be used to locate and retrieve a RPCV for a given servo field. After the RPCV is stored, control transfers to the querying operation 648, wherein it is asked whether a RPCV has been calculated for every servo field. If a RPCV has not been calculated for every servo field, the "no" path is taken from querying operation 648 and control transfers to the incrementing operation 650. The incrementing operation 650 increments the current servo field by one so that the RPCV for the next servo field can be calculated and stored in the table. If, on the other hand, it is determined in querying operation 648 that the process has calculated a RPCV for every servo field, control transfers to return operation 652, which transfers control back to the invoking module.

Referring to FIG. 7 there is shown a flow control diagram illustrating an exemplary process of creating read ZAP fields and write ZAP fields in a preferred embodiment of the invention. As shown in FIG. 3, a ZAP field is preferably stored in either a read ZAP field, for example read ZAP field 310, or a write ZAP field, for example, write ZAP field 320. Read ZAP fields are positioned in line with, or centered around, the data null line 323. Write ZAP fields are positioned in line with (i.e., centered around) the servo null line 324. FIG. 7 illustrates an exemplary process by which a particular RPCV is stored in either a read ZAP field or a write ZAP field.

In FIG. 7 processing begins at start operation 700. Control then transfers to the querying operation 701, wherein it is determined whether the ZAP type is a read type. If it is, control transfers to storing operation 702 in which the RPCV is stored in a read ZAP field centered around the data null line 323. If, on the other hand, it is determined in querying operation 700 that the ZAP type is not the read type, but rather the write type, control transfers to the storing operation 704. The storing operation 704 stores the RPCV in a write ZAP field centered around the servo null line. From the storing operations 702 and 704, control transfers return operation 706, wherein control is returned to the calling module.

Figure 8:
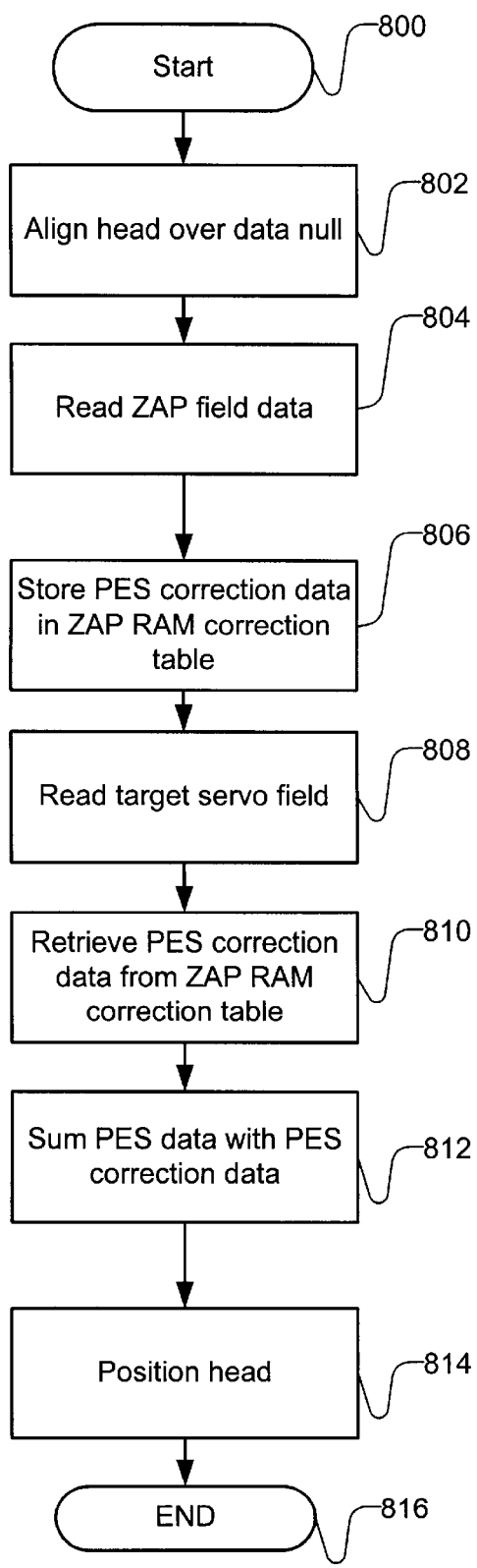
FIG. 8 is a flow control diagram illustrating an exemplary process of using read ZAP field data to correct PES data in a preferred embodiment of the invention.

Referring now to FIG. 8, there is shown a flow control diagram that illustrates an exemplary process of using read ZAP field data to correct PES data in a preferred embodiment of the invention. Processing begins at start operation 800. Control then transfers to aligning operation 802, wherein the transducer head 118 is aligned over the data null 323, as in a read operation. Control then transfers to read operation 804, wherein a ZAP field is read. Reading the ZAP field includes performing ECC validation and extraction of RPCVs and the servo field number. Control transfers from read operation 804 to the storing operation 806 wherein the RPCVs are stored in the ZAP RAM correction table 508. The disc is spun to a position where the target servo field can be read and control transfers to the read operation 808. Read operation 808 reads the servo field number as well as the PES data for the servo field. Control then transfers to retrieving operation 810 wherein the servo field number is used to index into the ZAP RAM correction table 508 and the associated RPCV is retrieved from there. Control then transfers to the summing operation 812 wherein the retrieved RPCV is summed with the PES data from the target servo field to generate a corrected PES. Control then transfers to the positioning operation 814 wherein the head 118 is positioned using the corrected PES. Control then transfers to the end at operation 816.

Figure 9:
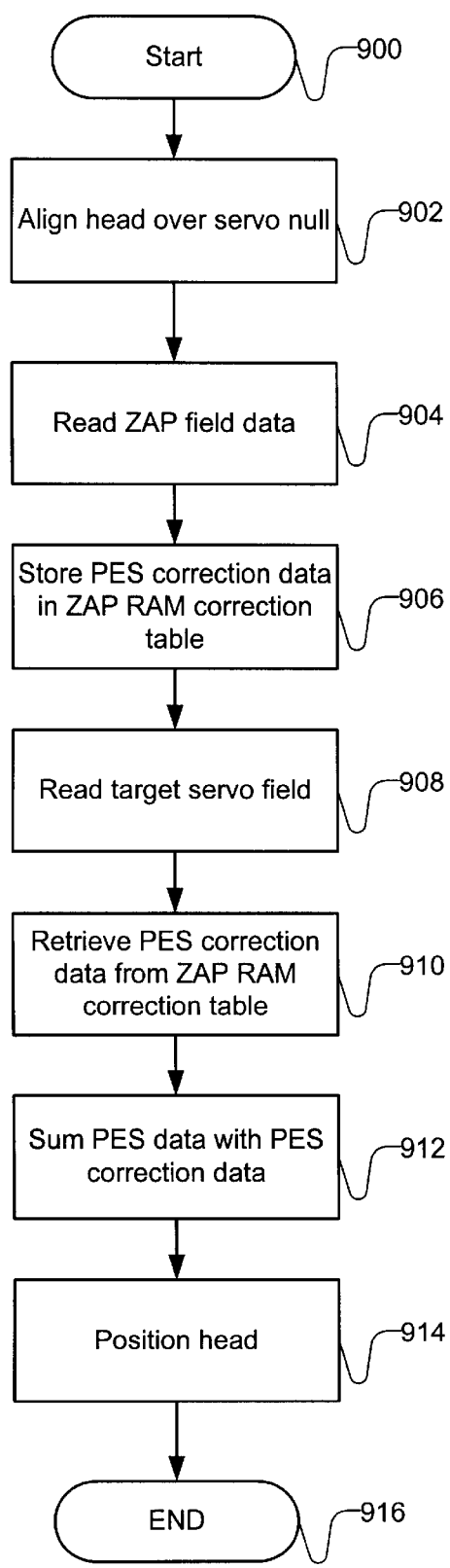
FIG. 9 is a flow control diagram illustrating an exemplary process of using write ZAP field data to correct PES data in a preferred embodiment of the invention.

Turning now to FIG. 9 there is shown a flow control diagram illustrating an exemplary process of using write ZAP field data to correct PES data in a preferred embodiment of the invention. Processing begins at start operation 900. Control then transfers to aligning operation 902, wherein the transducer head 118 is aligned over the servo null, as in a write operation. Control then transfers to read operation 904 wherein a ZAP field is read. Reading the ZAP field includes performing ECC validation and extraction of RPCVs and the servo field number. Control transfers from read operation 904 to the storing operation 906 wherein the RPCVs are stored in the ZAP RAM correction table 508. The disc is spun to a position where the target servo field can be read and control transfers to the read operation 908. Read operation 908 reads the servo field number as well as the PES data for the servo field. Control then transfers to retrieving operation 910 wherein the servo field number is used to index into the ZAP RAM correction table 508 and the associated RPCV is retrieved from there. Control then transfers to the summing operation 912 wherein the retrieved RPCV is summed with the PES data from the target servo field to generate a corrected PES. Control then transfers to positioning operation 914 wherein the head 118 is positioned using the corrected PES. Control then transfers to the end at operation 916.

The logical operations of the various embodiments of the present invention are implemented (1) as a sequence of computer implemented acts or program modules running on a computing system and/or (2) as interconnected machine logic circuits or circuit modules within the computing system. The implementation is a matter of choice dependent on the performance requirements of the computing system implementing the invention. Accordingly, the logical operations making up the embodiments of the present invention described herein are referred to variously as operations, structural devices, acts or modules. It will be recognized by one skilled in the art that these operations, structural devices, acts and modules may be implemented in software, in firmware, in special purpose digital logic, and any combination thereof without deviating from the spirit and scope of the present invention as recited within the claims attached hereto.

In summary, the present invention may be viewed as a method for compensating for errors in the radial locations of servo fields (such as 302, 304, 306, 308, 422, or 424) on a rotatable disc (such as 108) in a disc drive (such as 100). The method includes the steps (such as in operations 608 and 636) of determining (such as operation 608 or 642) a radial position compensation value (such as 410, 412, 414, 415, 416, 417, 418, or 420) for a target servo field (such as 302, 304, 306, 308, 422, or 424) on a track (such as 300), and storing (such as operation 636, 702, or 704) the radial position compensation value (such as 410, 412, 414, 415, 416, 417, 418, or 420) in a zero-acceleration path(ZAP) field (such as 310, 312, 320, or 322) located rotationally prior to the target servo field (such as 302, 304, 306, 308, 422, or 424) on the track (such as 300).

The method also include steps of determining (such as operation 608 or 642) three more radial position compensation values (such as 410, 412, 414, 415, 416, 417, 418, or 420) for three target servo fields (such as 302, 304, 306, 308, 422, or 424) located rotationally subsequent to the first ZAP field (such as 310, 312, 320, or 322), and storing (such as operation 636, 702, or 704) them in the first ZAP field (such as 310, 312, 320, or 322) in addition to the first radial position compensation value (such as 410, 412, 414, 415, 416, 417, 418, or 420).

The method also includes determining (such as operation 608 or 642) radial position compensation values (such as 410, 412, 414, 415, 416, 417, 418, or 420) for all other servo fields (such as 302, 304, 306, 308, 422, or 424) around a track (such as 300) and storing (such as operation 636, 702, or 704) a radial position compensation value (such as 410, 412, 414, 415, 416, 417, 418, or 420) for a servo field (such as 302, 304, 306, 308, 422, or 424) in a rotationally adjacent ZAP field (such as 310, 312, 320, or 322).

The invention may also be viewed as a method of storing (such as operation 636, 702, or 704) radial position compensation values (such as 410, 412, 414, 415, 416, 417, 418, or 420) in which the steps of storing include writing (such as operation 702) a radial position compensation value (such as 410, 412, 414, 415, 416, 417, 418, or 420) to a read ZAP field (such as 310 or 312) that is in line with a data null (such as 323), and writing (such as operation 704) the same radial position compensation value (such as 410, 412, 414, 415, 416, 417, 418, or 420) to a write ZAP field (such as 320 or 322) that is in line with a servo null (such as 324). The method also includes steps of storing (such as operation 636) radial position compensation values (such as 410, 412, 414, 415, 416, 417, 418, or 420) for all servo fields (such as 302, 304, 306, 308, 422, or 424) on a track (such as 300) in read ZAP fields (such as 310 or 312) that are in line with the data null (such as 323), and in write ZAP fields (such as 320, 322, or 426) that are in line with the servo null (such as 324).

The invention may also be viewed as a method for correcting (such as operations 810, 812, and 814) errors in a position error signal (PES) stored in a servo field (such as 302, 304, 306, 308, 422, or 424) on a track (such as 300) on a data storage disc (such as 108), for use during a read operation, by aligning (such as operation 802) the head (such as 118) over a data null (such as 323), reading (such as operation 804) a starting servo field number (such as 406 or 408) and a radial position compensation value (such as 410, 412, 414, 415, 416, 417, 418, or 420) for a target servo field (such as 302, 304, 306, 308, 422, or 424) from a read ZAP field (such as 310 or 312) centered on the data null (such as 323), storing (such as operation 806) the radial position compensation value (such as 410, 412, 414, 415, 416, 417, 418, or 420) in a ZAP RAM correction table (such as 508), reading (such as operation 808) a PES from the target servo field (such as 302, 304, 306, 308, 422, or 424), retrieving (such as operation 810) from the ZAP RAM correction table (such as 508) the radial position compensation value (such as 410, 412, 414, 415, 416, 417, 418, or 420) associated with the target servo field (such as 302, 304, 306, 308, 422, or 424), combining (such as operation 812) the PES from target servo field (such as 302, 304, 306, 308, 422, or 424) with the radial position compensation value (such as 410, 412, 414, 415, 416, 417, 418, or 420) to generate (such as operation 812) a corrected PES, and positioning (such as operation 814) the head (such as 118) in accordance with the corrected PES.

The correcting method also includes reading (such as operation 804) more than one radial position compensation value (such as 410, 412, 414, 415, 416, 417, 418, or 420), wherein each one of the radial position compensation values (such as 410, 412, 414, 415, 416, 417, 418, or 420) is associated with a target servo field (such as 302, 304, 306, 308, 422, or 424), and storing (such as operation 806) all of the radial position compensation values (such as 410, 412, 414, 415, 416, 417, 418, or 420) in a ZAP RAM correction table (such as 508). The method may include reading (such as operation 804) four radial position compensation values (such as 410, 412, 414, and 416) and storing (such as operation 806) the four radial position compensation values (such as 410, 412, 414, or 416) in the ZAP RAM correction table (such as 508).

The invention may also be viewed as a method for correcting (such as operations 910, 912, and 914) errors in a position error signal (PES) stored in a servo field (such as 302, 304, 306, 308, 422, or 424) on a track (such as 300) on a data storage disc (such as 108), for use during a write operation, by aligning (such as operation 902) the head (such as 118) over a servo null (such as 324), reading (such as operation 904) a starting servo field number (such as 406 or 408) and a radial position compensation value (such as 410, 412, 414, 415, 416, 417, 418, or 420) for a target servo field (such as 302, 304, 306, 308, 422, or 424) from a write ZAP field (such as 320 or 322) centered on the servo null (such as 324), storing (such as operation 906) the radial position compensation value (such as 410, 412, 414, 415, 416, 417, 418, or 420) in a ZAP RAM correction table (such as 508), reading (such as operation 908) a PES from the target servo field (such as 302, 304, 306, 308, 422, or 424), retrieving (such as operation 910) from the ZAP RAM correction table (such as 508) the radial position compensation value (such as 410, 412, 414, 415, 416, 417, 418, or 420) associated with the target servo field (such as 302, 304, 306, 308, 422, or 424), combining (such as operation 912) the PES from target servo field (such as 302, 304, 306, 308, 422, or 424) with the radial position compensation value (such as 410, 412, 414, 415, 416, 417, 418, or 420) to generate a corrected PES, and positioning (such as operation 914) the head (such as 118) in accordance with the corrected PES.

The correcting method also includes reading (such as operation 904) more than one radial position compensation value (such as 410, 412, 414, 415, 416, 417, 418, or 420), wherein each of the radial position compensation values (such as 410, 412, 414, 415, 416, 417, 418, or 420) is associated with a target servo field (such as 302, 304, 306, 308, 422, or 424), and storing (such as operation 906) all of radial position compensation values (such as 410, 412, 414, 415, 416, 417, 418, or 420) in a ZAP RAM correction table (such as 508). The method may include reading (such as operation 904) four radial position compensation values (such as 410, 412, 414, and 416) from a write ZAP field (such as 320 and 322) and storing (such as operation 906) the four radial position compensation values (such as 410, 412, 414, and 416) in the ZAP RAM correction table (such as 508).

The invention may also be viewed as a disc drive (such as 100) with discs (such as 108) with servo information arranged in servo fields (such as 302, 304, 306, 308, 422, or 424) on tracks (such as 300) on the disc (such as 108), an actuator assembly (such as 110) mounted adjacent the disc (such as 108) having a transducer head (such as 118) for accessing the servo fields (such as 302, 304, 306, 308, 422, or 424) on the tracks (such as 300), a servo circuit (such as 124, 126, 502, 504, 506, 508, and 510) that is coupled to the actuator assembly (such as 110) for controlling radial position of the head (such as 118) in response to the servo information and minimizes effects of errors in radial location of the servo fields (such as 302, 304, 306, 308, 422, or 424) on the disc (such as 108) by utilizing ZAP fields (such as 310, 312, 320, or 322) on the disc (such as 108), each ZAP field (such as 310, 312, 320, or 322) having position error signal(PES) correction data (such as 410, 412, 414, 415, 416, 417, 418, or 420) for one or more associated servo fields (such as 302, 304, 306, 308, 422, or 424). The disc drive may also include a ZAP RAM correction table (such as 508) for use in correcting errors in PES data.

It will be clear that the present invention is well adapted to attain the ends and advantages mentioned as well as those inherent therein. While a presently preferred embodiment has been described for purposes of this disclosure, various changes and modifications may be made which are well within the scope of the present invention. For example, ZAP fields could be located immediately prior to servo fields. As a further example, correction data could be longer than a byte in length. Numerous other changes may be made which will readily suggest themselves to those skilled in the art and which are encompassed in the spirit of the invention disclosed and as defined in the appended claims.

What is claimed is:

1. In a disc drive having a rotatable disc, a head-positioning actuator adjacent the disc for selectively positioning a transducer head over the disc, and an actuator servo control circuit for controlling the position of the head relative to the disc in response to servo information stored in servo fields recorded on tracks on the disc, the tracks having data nulls and servo nulls, a method for compensating for errors in the radial locations of the servo fields comprising steps of:

(a) determining a first radial position compensation value for a first target servo field on a track; and (b) storing the first radial position compensation value in a first zero-acceleration path (ZAP) field located rotationally prior to the first target servo field on the track.

2. The method according to claim 1 further comprising steps of:

(c) determining a second radial position compensation value for a second target servo field located rotationally subsequent to the first ZAP field; and (d) storing the second radial position compensation value in the first ZAP field in addition to the first radial position compensation value.

3. The method according to claim 2 further comprising steps of:

(e) determining a third radial position compensation value for a third target servo field located subsequent to the first ZAP field; and (f) storing the third radial position compensation value in the first ZAP field in addition to the first and second radial position compensation values.

4. The method according to claim 3 further comprising steps of:

(g) determining a fourth radial position compensation value for a fourth target servo field located subsequent to the first ZAP field; and (h) storing the fourth radial position compensation value in the first ZAP field in addition to the first, second, and third radial position compensation values.

5. The method according to claim 1 further comprising:

(c) repeating determining step (a) for a next target servo field; and (d) storing the first radial position compensation value in a next ZAP field.

6. The method according to claim 1 wherein the storing step (b) comprises steps of:

(b)(i) writing the first radial position compensation value to the first ZAP field at a location in line with a data null on the track to create a first read ZAP field; and (b)(ii) writing the first radial position compensation value to a previous ZAP field rotationally prior to the first ZAP field to a location in line with a servo null on the track. to create a first write ZAP field.

7. The method according to claim 5 wherein the storing step (b) comprises storing the first radial position compensation value in the first ZAP field in a location in line with the data null on the track, and the storing step (d) comprises storing the first radial position compensation value in the next ZAP field in a location in line with the servo null on the track.

8. A method for correcting errors in a position error signal (PES) stored in a servo field on a track on a data storage disc, for use during a read operation, in a disc drive having a transducer head controllably positionable over the track on the disc having data nulls and servo nulls, the method comprising steps of:

(a) aligning the head over a data null;

(b) reading a starting servo field number and a radial position compensation value for a target servo field from a first read zero-acceleration path (ZAP) field centered on the data null;

(c) storing the radial position compensation value read in step (b) in a zero-acceleration path (ZAP) random access memory (RAM) correction table;

(d) reading a PES from the target servo field;

(e) retrieving from the ZAP RAM correction table the radial position compensation value associated with the target servo field;

(f) combining the PES from target servo field with the radial position compensation value to generate a corrected PES; and (g) positioning the head in accordance with the corrected PES.

9. The method according to claim 8 wherein the reading step (b) further comprises reading a plurality of radial position compensation values, wherein each one of the plurality of radial position compensation values is associated with one of a plurality of target servo fields, and the storing step (c) further comprises storing the plurality of radial position compensation values in the ZAP RAM correction table.

10. The method according to claim 9 wherein the reading step (b) comprises reading four radial position compensation values and storing step (c) comprises storing the four radial position compensation values in the ZAP RAM correction table.

11. A method for correcting errors in a position error signal (PES) stored in a servo field on a track on a data storage disc, for use during a write operation, in a disc drive having a transducer head controllably positionable over the track on the disc having data nulls and servo nulls, the method comprising steps of:

(a) aligning the head over a servo null;

(b) reading a starting servo field number and a radial position compensation value for a target servo field from a first write zero-acceleration path (ZAP) field centered on the servo null;

(c) storing the radial position compensation value read in step (b) in a ZAP random access memory (RAM) correction table;

(d) reading a PES from the target servo field;

(e) retrieving from the ZAP RAM correction table the radial position compensation value associated with target servo field;

(f) combining the PES from the target servo field with the radial position compensation value to generate a corrected PES; and (g) positioning the head in accordance with the corrected PES.

12. The method according to claim 11 wherein the reading step (b) further comprises reading a plurality of radial position compensation values, wherein each one of the plurality of radial position compensation values is associated with one of a plurality of target servo fields, and the storing step (c) further comprises storing the plurality of radial position compensation values in the ZAP RAM correction table.

13. The method according to claim 12 wherein the reading step (b) comprises reading four radial position compensation values and storing step (c) comprises storing the four radial position compensation values in the ZAP RAM correction table.

14. A disc drive comprising:

a disc having servo information arranged as a plurality of servo fields on tracks on the disc;

an actuator assembly mounted adjacent the disc having a transducer head for accessing the servo fields on the tracks; and a servo circuit, operably coupled to the actuator assembly for controlling radial position of the head in response to the servo information, wherein the servo circuit minimizes effects of errors in radial location of the servo fields on the disc by utilizing a plurality of ZAP fields on the disc, each zero-acceleration path (ZAP) field having position error signal(PES) correction data for its associated servo field.

15. The disc drive of claim 14 wherein each ZAP field contains data for four target servo fields.

16. The disc drive according to claim 14, wherein the servo circuit includes a ZAP random access memory table (RAM) correction table for use in correcting errors in PES data.

* * * * *